United States Patent
Etemad

(10) Patent No.: US 8,817,644 B2
(45) Date of Patent: Aug. 26, 2014

(54) COMMON FRAMEWORK FOR ADVANCED MULTI-CELL AND MULTI-RAT COORDINATED OPERATIONS

(75) Inventor: Kamran Etemad, Potomac, MD (US)

(73) Assignee: Intel Corporation, Santa Clara, CA (US)

(*) Notice: Subject to any disclaimer, the term of this patent is extended or adjusted under 35 U.S.C. 154(b) by 167 days.

(21) Appl. No.: 13/168,028

(22) Filed: Jun. 24, 2011

(65) Prior Publication Data

US 2012/0113839 A1    May 10, 2012

Related U.S. Application Data

(60) Provisional application No. 61/410,740, filed on Nov. 5, 2010.

(51) Int. Cl.

| | |
|---|---|
| *H04L 12/26* | (2006.01) |
| *H04L 1/20* | (2006.01) |
| *H04B 7/04* | (2006.01) |
| *H04B 7/02* | (2006.01) |
| *H04W 52/36* | (2009.01) |
| *H04L 5/00* | (2006.01) |
| *H04B 7/06* | (2006.01) |
| *H04W 72/04* | (2009.01) |
| *H04W 40/24* | (2009.01) |
| *H04W 52/02* | (2009.01) |
| *H04W 52/34* | (2009.01) |
| *H04W 52/14* | (2009.01) |
| *H04L 1/00* | (2006.01) |

(52) U.S. Cl.
CPC ...... *H04L 1/009* (2013.01); *H04L 1/20* (2013.01); *H04B 7/0452* (2013.01); *H04B 7/0413* (2013.01); *H04B 7/024* (2013.01); *H04W 52/365* (2013.01); *H04L 5/0048* (2013.01); *H04B 7/0482* (2013.01); *H04B 7/0639* (2013.01); *H04B 7/0456* (2013.01); *H04W 72/0473* (2013.01); *H04W 40/24* (2013.01); *H04W 52/34* (2013.01); *H04W 52/146* (2013.01); *H04L 2001/0093* (2013.01); *H04B 7/0617* (2013.01); *H04W 52/0209* (2013.01); *H04B 7/0652* (2013.01); *H04L 2001/0097* (2013.01); *H04W 72/042* (2013.01)
USPC .......................................... 370/252; 370/392

(58) Field of Classification Search
CPC ...................................................... H04B 7/024
USPC ................................ 370/252, 392; 455/456.1
See application file for complete search history.

(56) References Cited

U.S. PATENT DOCUMENTS

| | | |
|---|---|---|
| 2009/0180451 A1 | 7/2009 | Alpert et al. |
| 2010/0067434 A1 | 3/2010 | Siu et al. |

(Continued)

FOREIGN PATENT DOCUMENTS

| | | |
|---|---|---|
| WO | 2012/061734 A2 | 5/2012 |
| WO | 2012/061734 A3 | 7/2012 |

OTHER PUBLICATIONS

Etemad et al., "A Framework for Coordinated Multipoint Transmission Based on a Multicell MAC/RRC Design", U.S. Appl. No. 13/165,946, filed Jun. 22, 2011, 31 pages.

(Continued)

*Primary Examiner* — Wei Zhao
(74) *Attorney, Agent, or Firm* — Kacvinsky Daisak Bluni PLLC

(57) ABSTRACT

Embodiments of a system and methods for advanced multi-cell coordinated operations are generally described herein. Other embodiments may be described and claimed.

28 Claims, 5 Drawing Sheets

(56) References Cited

U.S. PATENT DOCUMENTS

2010/0322426 A1* 12/2010 Keevill et al. ............... 380/270
2011/0002283 A1* 1/2011 Drugge et al. ............... 370/329
2011/0222457 A1* 9/2011 Lee et al. ..................... 370/312

OTHER PUBLICATIONS

Etemad, Kamran, "Multi-Carrier Operational Modes in Wireless Communications Protocol, Method of Initializing a Mobile Station in Order to Prepare for Multi-Carrier Operation in Same, and Carrier Management Method in Same", U.S. Appl. No. 12/766,170, filed Apr. 23, 2010, 35 pages.

Zhu et al., "Control Channel Interference Mitigation", U.S. Appl. No. 12/971,701, filed Dec. 17, 2010, 21 pages.

Etemad, Kamran, "Configuring Component Carriers in Carrier Aggregation", U.S. Appl. No. 12/975,725, filed Dec. 22, 2010, 40 pages.

Yuk et al., "Coordinated AP for tightly coupled BS-AP interworking for Multi-RAT devices", IEEE 802.16 Broadband Wireless Access Working Group, IEEE 802.16ppc-10/0066, Nov. 2, 2010, 9 pages.

Jung et al., "Comments and Text Proposal on Study Report on Hierarchical Networks", IEEE 802.16 Broadband Wireless Access Working Group, IEEE 802.16ppc-10/0062r2, Sep. 15, 2010, 17, pages.

International Search Report and Written Opinion received for PCT Patent Application No. PCT/US2011/059375, mailed on Apr. 24, 2012, 8 pages.

Intel, "Clarifications and Design Requirements for CoMP Scenarios 1-3", 3GPP TSG-RAN WG1 #64, Feb. 21-25, 2011, (Author unknown), 4 pages.

Extended European Search Report received for European Patent Application No. 11838891.7, mailed Mar. 11, 2014, 9 pages.

* cited by examiner

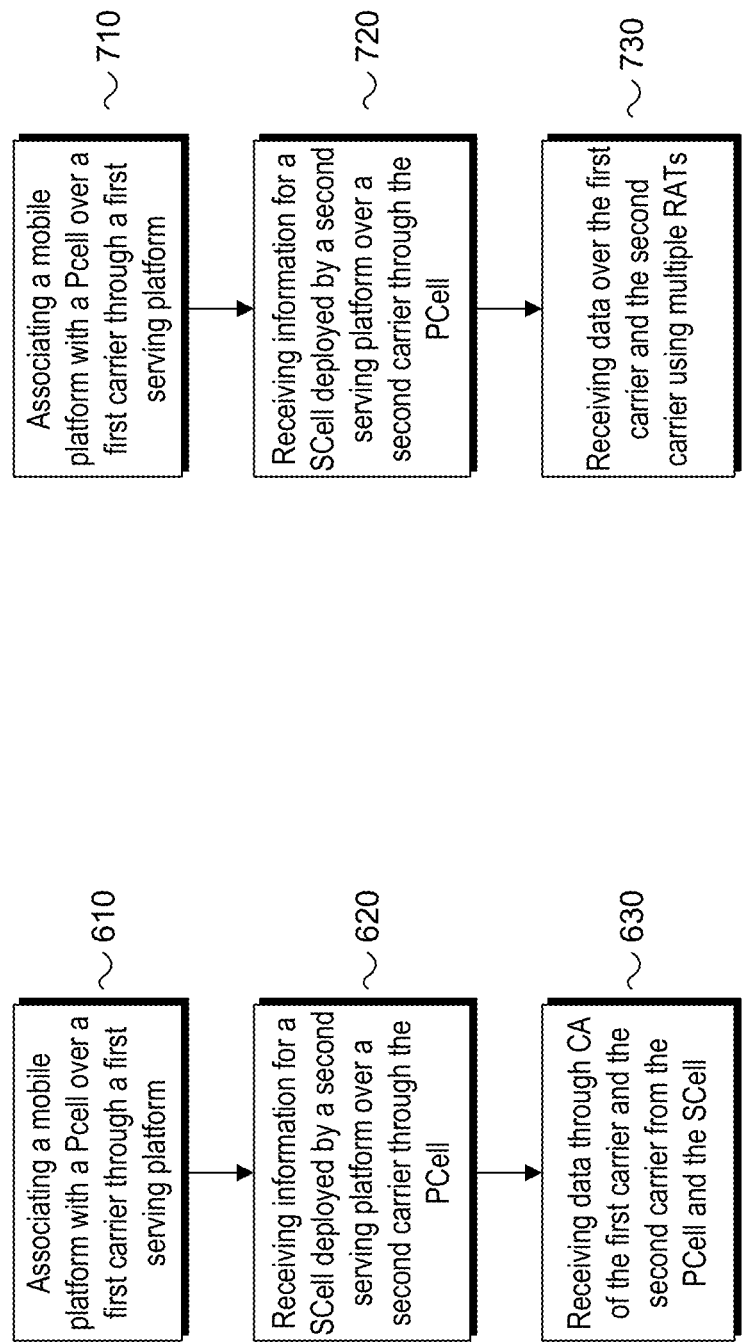

COMMON FRAMEWORK FOR ADVANCED MULTI-CELL AND MULTI-RAT COORDINATED OPERATIONS

CLAIM OF PRIORITY

The present application claims priority to U.S. Provisional Application 61/410,740 titled "Advanced Wireless Communication Systems and Techniques" filed Nov. 5, 2010, which is incorporated by reference in its entirety.

FIELD OF THE INVENTION

This application relates to wireless systems and, more particularly, to coordination of multiple wireless protocol solutions in a common framework.

BACKGROUND

Fixed and mobile platforms used in wireless communications systems, such as nodes, user equipment (UE), stations, subscriber stations (SS), mobile stations (MS) or advanced mobile stations (AMS) communicate with other platforms, fixed or mobile, such enhanced node-B (eNB), base stations (BS) or advanced base stations (ABS) in a wireless network. A variety of wireless protocols corresponding to various types of wireless networks, including two or more of the same wireless networks, can co-exist wherein two or more wireless networks overlap resulting in a plurality of wireless networks in a location, over one or more cells, or within an environment. Multi-radio access technology (multi-RAT) platforms can be configured to communicate over a number of the wireless protocols to access a plurality of wireless networks having various characteristics and deployment models.

In particular, wireless personal area networks (WPANs) offer fast, short-distance connectivity within a relatively small space such as an office workspace or a room within a home. Wireless local area networks (WLANs) provide broader range than WPANs within office buildings, homes, schools, etc. Wireless metropolitan area networks (WMANs) can cover a greater distance than WLANs by connecting, for example, buildings to one another over a broader geographic area. Wireless wide area networks (WWANs) can provide the broadest range as such networks are widely deployed in cellular infrastructure. In addition broadcast only networks are also deployed to offer downlink only traffic such as multicast and broadcast videos and audio services over large cells.

BRIEF DESCRIPTION OF THE DRAWINGS

The present invention is illustrated by way of example and not as a limitation in the figures of the accompanying drawings, in which:

FIG. 6 is a method for multi-cell coordinated operations according to some embodiments; and FIG. 7 is a method for multi-cell and multi-RAT coordinated operations according to some embodiments.

DETAILED DESCRIPTION

Figure 1:
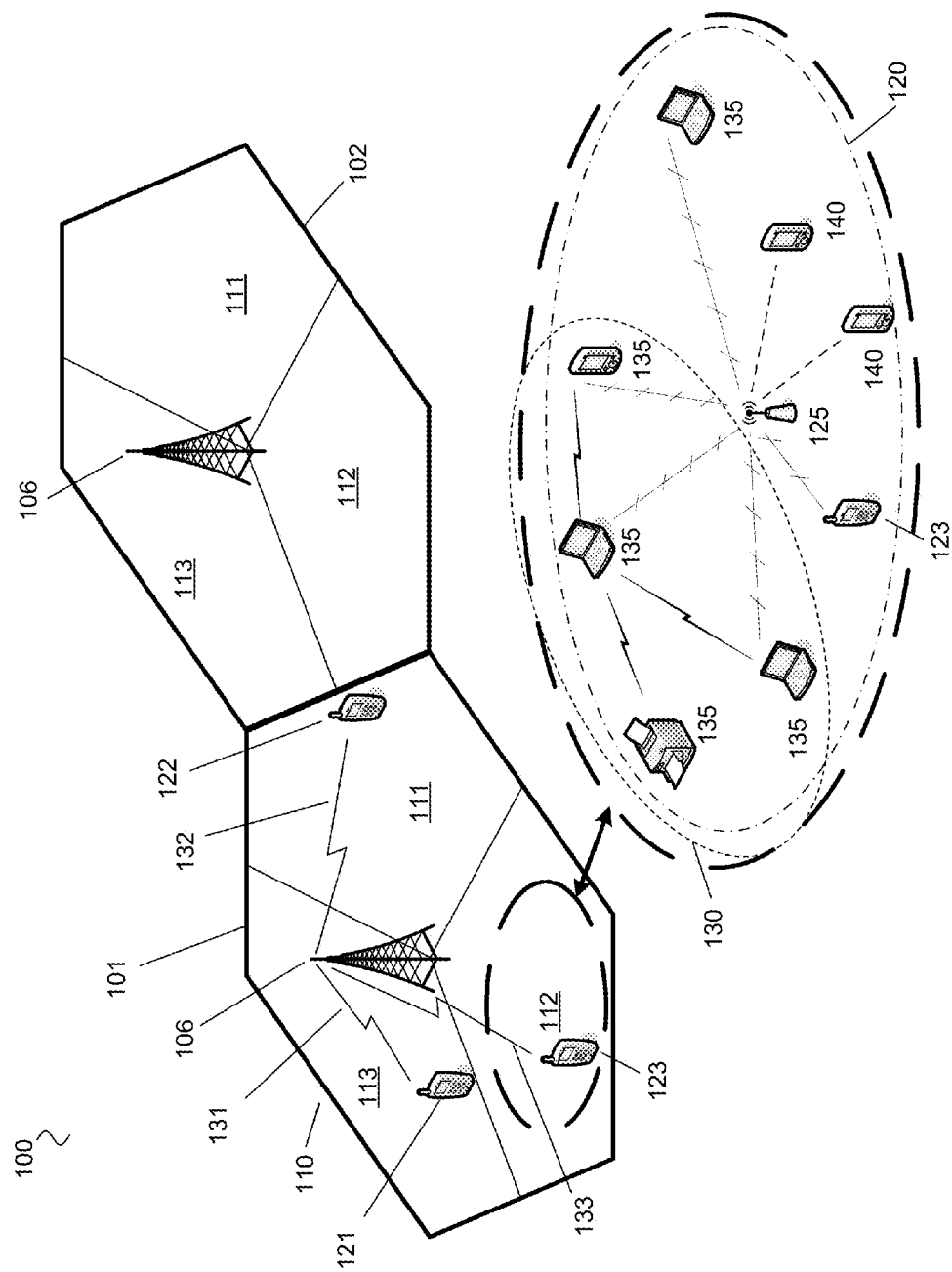
FIG. 1 is an illustration of a wireless communication system according to some embodiments.

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention. For the purposes of the detailed description, the phrase "A/B" means A or B. The phrase "A and/or B" means "(A), (B), or (A and B)." The phrase "at least one of A, B and C" means "(A), (B), (C), (A and B), (A and C), (B and C) or (A, B and C)." Also, the phrase "(A)B" means "(B) or (AB)," that is, A is an optional element.

The following detailed description describes various embodiments of the invention, wherein the embodiments provide a common framework for multiple wireless protocols in homogeneous and heterogeneous networks accessible by a platform. While example embodiments are described herein in relation to platforms having single-RAT/multi-RAT that are capable of operating concurrently and/or simultaneously or nearly simultaneously over one or more carriers, the invention is not limited thereto and can be applied to other platforms capable of communication over a single carrier at a single time. Reference to a carrier or carrier wave is generally directed to a modulated waveform having an input signal and frequency for the purpose of conveying data or information. A number of carriers may be transmitted at the same or different frequencies to share a common physical transmission medium in a cell or across cells.

Reference herein to a single-RAT/multi-RAT platform may be a user equipment (UE), subscriber station (SS), station (STA), mobile station (MS), advanced mobile station (AMS), high throughput (HT) station (STA), and very HT STA (VHT STA), among others. The various forms of platform including the UE, SS, MS, HT STA, and VHT STA may be interchanged and reference to a particular platform does not preclude other platforms from being substituted in various embodiment(s). A single-RAT/multi-RAT platform may also be a base station (BS), access point (AP), node, node B, or enhanced node B (eNB). Further, these terms may be conceptually interchanged, depending on which wireless protocol is being employed, so a reference to eNB herein may also be seen as a reference to a BS, ABS, or AP, in various embodiments.

The inventive embodiments may be used in a variety of applications including transmitters and receivers, or transceivers, of a single-RAT/multi-RAT platform, although the present invention is not limited in this respect. Single-RAT/multi-RAT platforms that may fall within the scope of the invention include wired and/or wireless tablets, smartphones, cellular radiotelephone systems, satellite systems, personal communication systems (PCS), two-way radio systems, two-way pagers, personal computers (PCs) and related peripherals, laptops, netbooks, personal digital assistants (PDAs), personal computing accessories and all existing and future arising systems which may be related in nature and to which the principles of the inventive embodiments could be suitably applied.

It would be an advance in the art to enable multi-cell and single-RAT/multi-RAT capabilities such as radio resource or carrier aggregation (CA), coordinated multipoint transmission (CoMP), intercell interference coordination (ICIC), and cross cell switching and scheduling in a wireless communication system. Coordinated Multi-Point (CoMP) is a technique utilized to increase throughput and service quality in wireless networks, particularly at or near the edge of a given cell in a wireless network. In contrast to CA techniques which combine transmissions from two carriers operating on two different frequencies to increase data rates, CoMP transmission involves using two carriers operating on the same frequency utilizing different antenna ports/locations.

Radio resource aggregation across multiple cells on different frequencies can provide wider effective bandwidth. CoMP and ICIC using scheduling/transmission/radio resource management (RRM) across multiple cells on the same frequency can avoid interference and/or create a multi-platform multiple input multiple output (MIMO)/beamforming effect. Cross cell switching and scheduling can provide seamless reception of unicast traffic and broadcast/multicast data in multicarrier deployments of a single-RAT/multi-RAT that can be applied across multiple platforms (e.g. eNBs and/or BSs). A common framework is described herein to provide a consistent design to provide these capabilities in embodiments wherein multiple cells, collocated or otherwise, are provided over a number of single-RAT/multi-RAT platforms in homogeneous and/or heterogeneous networks. Reference to a cell may indicate a cell deployed by a serving platform, a sector deployed by a serving platform wherein several sectors comprise a larger cell, or a carrier used by a serving platform, such as in a sector deployed by the serving platform.

The common framework to provide such capabilities can increase throughput, capacity, and/or coverage improvements in a wireless communications system 100, particularly for users in a wireless network located at or near a boundary or boundaries of a sector of a cell, or cell edges such as a first user 121, second user 122, and third user 123 in a first cell 101 of FIG. 1. The cell edges may be directly adjacent to another sector of the same cell site as in the case of the first user 121 (member of third sector 113 and adjacent to second sector 112 of first cell 101), directly adjacent to one or more sectors in another cell such as the second user 122 (member of first sector 111 of the first cell 101 and adjacent to second sector 112 and third sector 113 of second cell 102), or in the case of the third user 123, at a boundary of sector 112 of the first cell 101 but not directly adjoining another sector boundary. Each collocated, or adjoining, sector of the first cell 101 and the second cell 102 may be implemented using multiple antenna orientations of a serving platform 106 to serve the different sectors (i.e. 11, 112, and 113) of the same cell where each serving platform 106 is positioned. Additional users may be positioned in the sectors (i.e. 111, 112, and 113) of the cells (i.e. 101 and 102) in other embodiments.

The wireless communication system 100 may include one or more wireless networks in various embodiments, generally shown as 110, 120, and 130 wherein wireless networks 120 and 130 are positioned within the first cell 101 of WWAN 110 to provide a heterogeneous wireless network in the second sector 112 of the first cell 101 of WWAN 110. As shown in an exploded view of the second sector 112 of the first cell 101, a wireless local area network (WLAN) 120 served by access point (AP) 125, and a wireless personal area network (WPAN) 130 co-exist with the WWAN 110 in the wireless communications system 100. The third user 123, a multi-RAT platform 135 in the embodiments of FIG. 1, is configured to communicate with the AP 125 and the serving platform 106 of the first cell 101. The second cell 102 is illustrated in FIG. 1 as a WWAN 110 homogeneous network, however the embodiment is not so limited and other wireless networks may co-exist with the second cell 102.

Although FIG. 1 depicts three types of wireless networks, the wireless communication system 100 may include additional or fewer wireless networks including multiple overlapping wireless networks of the same type. For example, the wireless communication system 100 may include one or more WMANs (not shown), additional Broadcast Only systems, WPANs, WLANs, and/or WWANs. The methods and systems described herein are not limited in this regard.

The wireless communication system 100 also includes one or more platforms generally shown as multi-RAT platform 135 capable of accessing homogeneous and/or heterogeneous wireless networks, and single-RAT platforms 140 capable of accessing a number of homogeneous wireless networks. The wireless communication system 100 of FIG. 1 may include more or less platforms 135 and 140. The first user 121, second user 122, and the third user 123 may each either be a multi-RAT platform 135 or a single-RAT platform 140.

The platforms 135 and 140 may employ a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), single carrier frequency division multiple access (SC-FDMA), multi-carrier modulation (MDM), and/or other suitable modulation techniques to communicate via wireless links.

The platforms 135 and 140 may further operate in accordance with wireless communication protocols or wireless protocols in the wireless communication system 100. In particular, these wireless protocols may be based on analog, digital, and/or dual-mode communication system technologies such as a Third Generation Partnership Project (3GPP), Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Long Term Evolution (LTE) standards based on these technologies, Worldwide Interoperability for Microwave Access (WiMAX) Forum, and variations and evolutions of these standards, and/or other suitable wireless communication standards.

Further, the platforms 135 and 140 may operate over one or more other wireless protocols such as specifications and/or standards developed by special interest groups and/or standard development organizations including those relating to mobile television signals or digital television signals. In some embodiments, communications may be in accordance with specific communication standards, such as the Institute of Electrical and Electronics Engineers (IEEE) standards including IEEE 802.15 (e.g. Bluetooth), IEEE 802.11(a), 802.11(b), 802.11(g), 802.11(h) and/or 802.11(n) standards (referenced herein as Wi-Fi) and/or proposed specifications for WLANs, 802.15.3c, IEEE 802,11ad, Wireless HD SIG, ECMA TG20), and variations and evolutions of these standards, although the scope of the invention is not limited in this respect as they may also be suitable to transmit and/or receive communications in accordance with other techniques and standards.

The terms "television signal(s)" or "digital television signals" as used herein include, for example, signals carrying television information, signals carrying audio/video information, Digital Television (DTV) signals, digital broadcast signals, Digital Terrestrial Television (DTTV) signals, signals in accordance with one or more Advanced Television Systems Committee (ATSC) standards, Vestigial SideBand (VSB) digital television signals (e.g., 8-VSB signals), Coded OFDM (COFDM) television signals, Digital Video Broadcasting-Terrestrial (DVB-T) signals, DVB-T2 signals, DVB-H, Integrated Services Digital Broadcasting (ISDB) signals, digital television signals carrying MPEG-2 audio/video, digital television signals carrying MPEG-4 audio/video or H.264 audio/video or MPEG-4 part 10 audio/video or MPEG-4 Advanced Video Coding (AVC) audio/video, Digital Multimedia Broadcasting (DMB) signals, DMB-Handheld (DMB-H) signals, High Definition Television (HDTV) signals, progressive scan digital television signals (e.g., 720p), interlaced digital televisions signals (e.g., 1080i), television signals transferred or received through a satellite or a dish, television signals transferred or received through the atmosphere or through cables, signals that include (in whole or in part) non-television data (e.g., radio and/or data services) in addition to or instead of digital television data, or the like.

Among the television signals that may be utilized for video is the China digital television standard. The standard is designated number GB20600-2006 of the SAC (Standardization Administration of China), and is entitled "Framing Structure, Channel Coding and Modulation for Digital Television Terrestrial Broadcasting System", issued Aug. 18, 2006. The standard may also be referred to as DMB-T (Digital Multimedia Broadcasting-Terrestrial) or DMB-T/H (Digital Multimedia Broadcasting Terrestrial/Handheld). This standard will generally be referred to herein as "DMB-T".

Figure 2:
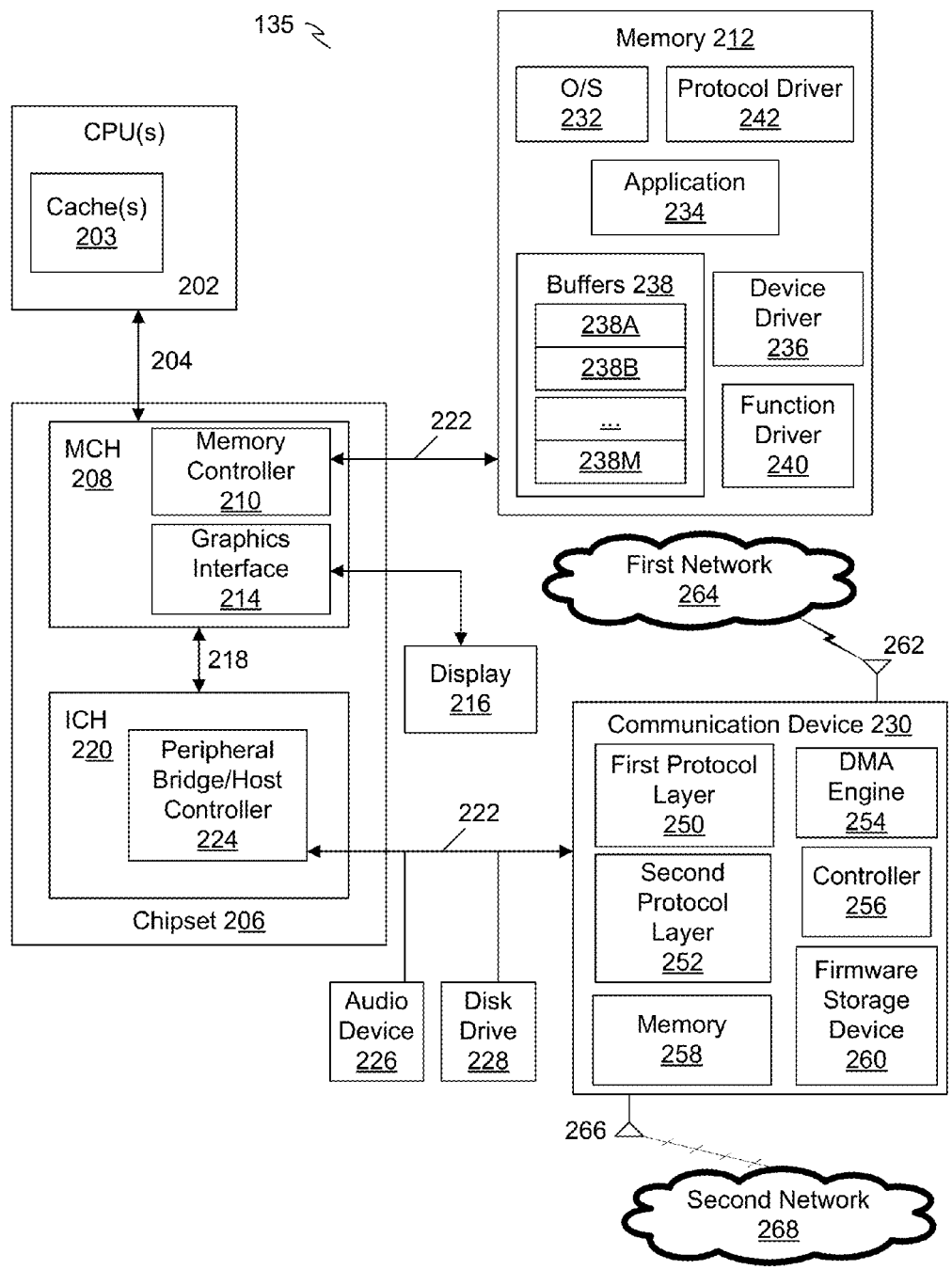
FIG. 2 is an illustration of a multi-RAT platform for use in a wireless communication system according to some embodiments.

FIG. 2 illustrates a block diagram of a multi-RAT platform 135 in accordance with various embodiments of the invention. The multi-RAT platform 135 may include one or more processors or central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network), etc. (including a reduced instruction set computer (RISC) processor or a complex instruction set computer (CISC)). Moreover, the processors 202 may have a single or multiple core design. The processors 202 with a multiple core design may integrate different types of processor cores, including graphics processing cores, on the same integrated circuit (IC) die. Also, the processors 202 with a multiple core design may be implemented as symmetrical or asymmetrical multiprocessors.

The processor 202 may include one or more caches 203, which may be private and/or shared in various embodiments. A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the multi-RAT platform 135. In various embodiments, the memory 212 may include one or more volatile storage or memory devices such as random access memory (RAM), dynamic RAM (DRAM), synchronous DRAM (SDRAM), static RAM (SRAM), etc. Nonvolatile memory may also be utilized such as phase change memory (PCM) or NAND and include a hard disk or solid state drive. Additional devices may be coupled to the interconnection network 204, such as multiple processors and/or multiple system memories.

The MCH 208 may further include a graphics interface 214 coupled to a display 216, which may be a passive or an interactive, e.g. various forms of a touch-screen, display. As shown in FIG. 2, a hub interface 218 may couple the MCH 208 to an input/output control hub (ICH) 220. The ICH 220 may provide an interface to input/output (I/O) devices coupled to the multi-RAT platform 135. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers.

Additionally, the multi-RAT platform 135 may include additional volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive or solid state drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the solid state drive 228 as part of memory management operations. The processor(s) 302 executes various commands and processes one or more packets 246 with one or more computing devices coupled a first network 264 and/or a second network 268.

As illustrated in FIG. 2, the communication device 230 includes a first network protocol layer 250 and a second network protocol layer 252 for implementing the physical (PHY) communication layer to send and receive network packets to and from a serving platform 106 (e.g. eNB, BS, AP, etc.) in an embodiment. The communication device 230 may further include a direct memory access (DMA) engine 252, which may write packet data to buffers 238 to transmit and/or receive data. Additionally, the communication device 230 may include a controller 254, which may include logic, such as a programmable processor for example, to perform communication device related operations. In various embodiments, the controller 254 may be a MAC (media access control) component. The communication device 230 may further include a memory 256, such as any type of volatile/nonvolatile memory (e.g., including one or more cache(s) and/or other memory types discussed with reference to memory 212).

The communication device 230 in FIG. 2 is configured to communicate using radio or transceiving means to transmit and receive over two networks (e.g. WWAN 110, WLAN 120, WPAN 130, and WWAN) using a first radio 262 and second radio 266, though the communication device 230 may be configured with more than two radios. In alternate embodiments, the communication device 230 may be configured with additional radios and protocol layers to operate over a WPAN 130 and/or a WMAN in addition to or in replacement of the WWAN 110 and/or the WLAN 120. Further, the multi-RAT platform 135 may also be configured to operate over two or more cells of the same wireless network (e.g. WWAN 110, WLAN 120, WPAN 130, and WWAN). The multi-RAT platform 135 may be configured to access or deploy one or more cells of a first network 264, one or more cells of a second network 268, and/or one or more cells of additional networks (not shown).

Figure 3:
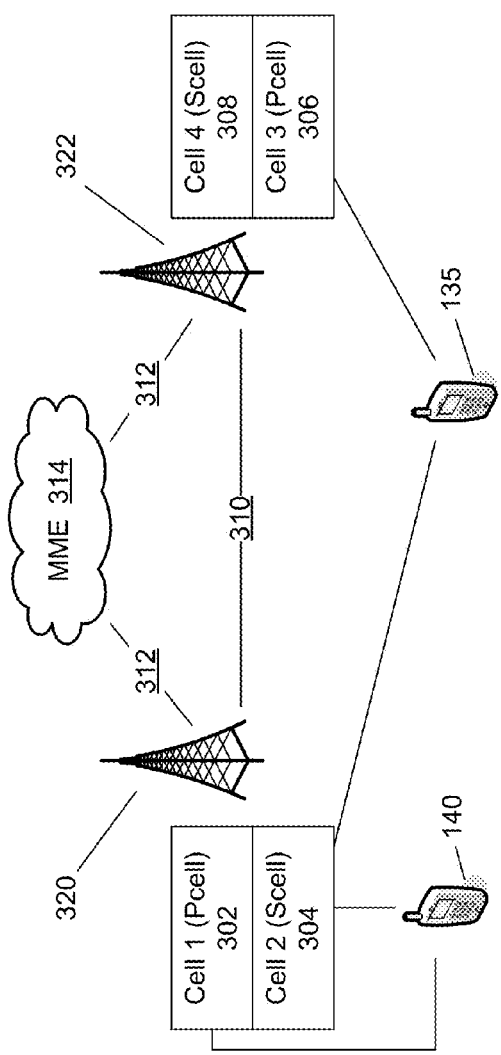
FIG. 3 is an illustration of multi-cell operation according to some embodiments.

FIG. 3 is an illustration of multi-cell operation and inter-cell operation across serving platforms 106, otherwise referred to as inter-platform operation coordination, according to some embodiments. In an embodiment, serving platforms 106, which may be eNBs in various embodiments, are linked over an inter-platform interface such as an X2 interface 310 or another inter-platform interface, which may be a wired or wireless connection that includes a control plane interface and a user plane interface for communication between the serving platforms 106, and provision of capabilities such as handover and multi-cell coordinated operations. In alternate embodiments, the serving platforms 106 are base stations or other types of nodes that deploy cells and the serving platforms 106 communicate over alternate wired or wireless links. The serving platforms 106 of FIG. 3 further communicate with a managing entity, such as a mobility management entity (MME) 314 to manage mobility aspects such as gateway selection and tracking area list management. Communication between each serving platform 106 and the MME 314 is accomplished in FIG. 3 using an S1 interface 312, which is a signaling interface between the serving platform 106 and the MME 314. Other interfaces may be used in alternate embodiments. Data traffic between the serving platform 106 and a serving gateway (not shown) is also provided by an S1 interface.

A first serving platform 320, which may be the serving platform 106 of FIG. 1, provides a number of collocated cells or sectors of cells (hereinafter referred to as cells), including a cell 1 primary cell (Pcell) 302 and a cell 2 secondary cell (Scell) 304 for communication with a single-RAT platform 140, wherein a wireless protocol used by cell 1 (Pcell) 302 and a cell 2 (Scell) 304 is the same wireless protocol type. For example, the cell 1 (Pcell) 302 and a cell 2 (Scell) 304 could both be LTE cells, or the cell 1 (Pcell) 302 and a cell 2 (Scell) 304 could both be WiMAX cells. Additional cells or sectors of cells could also be provided in other embodiments. The cell 2 (Scell) 304 also provides communication with a multi-RAT platform 135. A second serving platform 322 provides a number of collocated cells or sectors of cells, such as a cell 3 (Pcell) 306 and a cell 4 (Scell) 308 for communication with the multi-RAT platform 135. Additional platforms could also be deployed in alternate embodiments to communicate with the cells of FIG. 3. Further, the single-RAT platform 140 could be a multi-RAT platform 135 and/or the multi-RAT platform 135 could be a single-RAT platform 140 in alternate embodiments where the same wireless protocol is used by the first serving platform 320 and the second serving platform 322.

Multi-cell operations, such as those described in reference to FIG. 3 through FIG. 7 includes identification of a primary cell, such as the cell 1 (Pcell) 302. Primary cell capability and configuration criteria for multi-cell operation across sectors of cells or across cells are negotiated between the mobile platform, such as the single-RAT platform or the multi-RAT platform 135, and the first serving platform 320 of this embodiment. The first serving platform 320 with the cell 1 (Pcell) 302 is configured to maintain state and mobility control of the single-RAT platform 140 across other primary cells (e.g. cell 3 (Pcell) 306). Further, the cell 1 (Pcell) 302 also carries control channels used for cross cell assignments on the secondary cells such as a physical downlink control channel (PDCCH) and/or the multicast control channel (MCCH), as necessary. In embodiments, the PDCCH provides parameters such as downlink resource block allocation, uplink resource block allocation, modulation constellation information, and a type/rate of coding used per resource block. The MCCH, in embodiments, provides control information to the platforms 135 and 140 in a cell or a sector of a cell, wherein the MCCH is used by the platforms that receive multicast and/or broadcast services.

Information about potential and/or available secondary cells which may be configured and considered for multi-cell operation, such as the cell 2 (Scell) 304 and/or the cell 4 (Scell) 308, may be provided by the primary cell (e.g. cell 1 (Pcell) 302). Information about availability and configuration of the secondary cells and a type or mode of multi-cell operation are communicated to the platform (e.g. 135 or 140) through the cell 1 (Pcell) 302. Configuration information may be broadcast and/or multicast to one or more platforms, for example in embodiments where configuration information for the secondary cells is common to a plurality of platforms. Alternately, the configuration information of the secondary cells may be communicated to an individual platform using dedicated RRC signaling. Configuration information about a number of secondary cells may provide sufficient information about each secondary cell including an assigned cell index, such that each secondary cell can be activated for respective cross-cell operation type using one or more parameters, such as a Layer 2 indication in 3GPP embodiments. Activation of a secondary cell may demark the start of a multi-cell operation for a platform such as the single-RAT platform 140 or the multi-RAT platform 135, while deactivation of a secondary cell may demark an end of multi-cell operation.

In an embodiment where a primary cell is identified as the cell 1 (Pcell) 302, the cell 1 (Pcell) 302 configures secondary cells on other serving platforms, such as the cell 4 (Scell) 308 of the second serving platform 322. In embodiments, the cell 3 (Pcell) 306 may obtain configuration parameters of secondary cells, such as the cell 2 (Scell) 304 through the X2 interface 310 before the cell 3 (Pcell) 306 configures for a mobile platform such as the single-RAT platform 140 or the multi-RAT platform 135. The cell 3 (Pcell) 306 may also request resource reservation on the cell 2 (Scell) 304 prior to activation of the cell 2 (Scell) 304 to avoid conflicting usage of resources. The type of signaling and resource reservation can be dependent on the type of multi-cell operation. In an embodiment, the single-RAT platform 140 employing CoMP and ICIC may reserve radio resources on the cell 4 (Scell) 308, wherein the resource reservation(s) may be for time division multiplexing (TDM) or frequency division multiplexing (FDM) for cross cell allocation by the cell 1 (Pcell) 302. In alternate embodiments, such as the implementation of multimedia broadcast multicast service (MBMS) or broadcast services reservations, radio resources on a secondary cell may not apply and the primary cell can accomplish scheduling and/or avoid resource conflicts using other means known to one skilled in the art.

Figure 4:
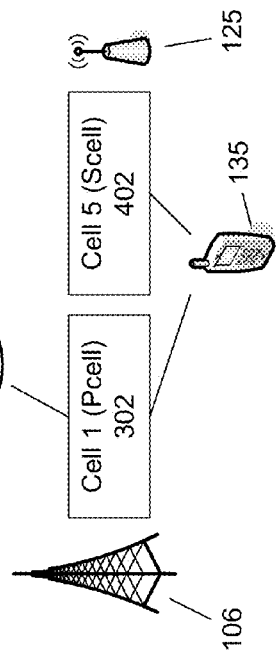
FIG. 4 is an illustration of multi-cell operation according to some embodiments.

FIG. 4 is an illustration of multi-cell operation according to some embodiments. A serving platform 106 and an access point 125 employ cells to serve a multi-RAT platform 135. The serving platform 106, which may communicate according to a number of WWAN or WMAN standards is configured to communicate using the cell 1 (Pcell) 302 over a 3GPP wireless protocol and the AP 125 is configured to communicate using a cell 5 (Scell) 402 over a Wi-Fi wireless protocol. The cell 1 (Pcell) 302 and the cell 5 (Scell) 402 in these embodiments operate using wireless protocols that are different from one another. In alternate embodiments, the cell 5 (Scell) 402 is evolution data optimized (EV-DO), high speed packet access (HSPA), or Bluetooth or a downlink broadcast optimized technology such as digital video broadcasting handheld (DVB-H) technology.

The multi-RAT platform 135, provisioned with a plurality of radio types to communicate in a number of homogeneous or heterogeneous networks, operates over both wireless protocols contemporaneously and/or simultaneously and is capable of interacting with a system architecture evolution (SAE) 410 gateway, wherein the SAE 410 is a core network architecture of 3GPP's LTE wireless communication standard or protocol. The SAE 410 of FIG. 4 can be replaced with appropriate core network architecture for other standards in alternate embodiments.

Initiation of multi-cell operation may be triggered by the platform (i.e. multi-RAT platform 135 or single-RAT platform 140) through measurements and/or link conditions determined by the platform (i.e. multi-RAT platform 135 or single-RAT platform 140), which may prompt activation of CoMP and/or ICIC to address issues such as interference encountered at a cell and/or cell sector boundary. Further, the multi-cell operation may be triggered by initiating or termination of MBMS data usage having a duration that surpasses a time duration relating to activities such as CoMP or ICIC.

In the embodiments of FIG. 4, the serving platform 106, which may be a multimode BS, AP, eNB, HeNB, or relay providing 3GPP Access, is collocated with the AP 125, or secondary RAT, to provide WiFi access. In other embodiments, the secondary RAT operates in the same or different licensed band (e.g. EV-DO or HSPA) and/or unlicensed bands (e.g. WiFi or Bluetooth) from the serving platform 106. In this embodiment, the primary cell provided by the serving platform 106 is configured to provide network connectivity, access, security, and mobility management as well as user traffic, while the secondary RAT can be used for Level 1 (physical) and Level 2 (data link) wireless data transmission protocols, and for user traffic. The secondary RAT may be configured with a separate core network (e.g. LTE and WiMAX) or the secondary RAT may not be configured with a core network (e.g. Wi-Fi and Bluetooth) in other embodiments. Further, the secondary RAT may be a downlink only broadcast optimized technology such as DVB-H, which can be used for multi-cast or broadcast data delivery. In these embodiments, the serving platform 106 may used as the primary cell for communication and feedback with a content server and to provide service continuity issues. In embodiments wherein two different wireless protocols are used, the cell 1 (PCell) 302 is used to provide resources and/or capabilities not available on the cell 5 (SCell) 402.

Figure 5:
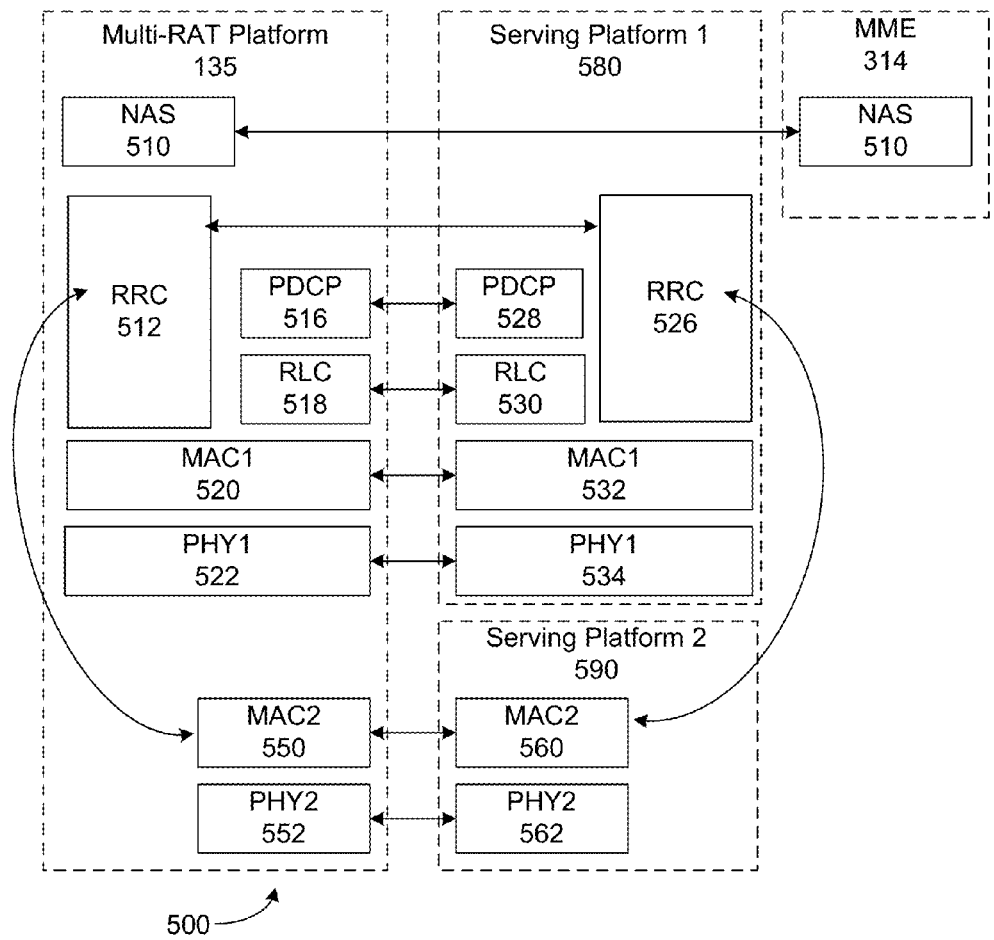
FIG. 5 is an illustration of data flow aggregation according to some embodiments.

FIG. 5 is an illustration of a control plane for data flow aggregation using a 3GPP wireless protocol, according to some embodiments. As shown in FIG. 5, control plane 500 comprises multi-RAT platform 135 coupled with a first serving platform 580 using a 3GPP wireless protocol and second serving platform 590 (e.g. eNB, AP, BS, node, etc.) providing a second wireless protocol, and mobility management entity (MME) 502. The multi-RAT platform 135 may be a UE comprising a non-access stratum (NAS) block 510, radio resource control (RRC) block 512, packet data convergence protocol (PDCP) block 516, radio link control (RLC) block 518, a first media access control (MAC1) block 520, a first physical layer (PHY1), a second MAC block (MAC2) 550, and a second PHY block (PHY2) 552. The serving platform 580 likewise comprises RRC block 526, PDCP block 528, RLC block 530, MAC block 532, and PHY block 534 and PHY 562 coupled to respective blocks of the Multi-RAT platform 135. Furthermore, the non-access stratum (NAS) block 510 of the multi-RAT platform 135 is coupled to NAS block 540 of mobility management entity (MME) 314, though the embodiment is not so limited. The RRC for each platform configures the radio, MAC and PHY layer parameters of SCells and their control structure for each UE. For example, in an embodiment where the serving platform 2 590 deploys the SCell, the RRC 526 configures the MAC2 560 and the PHY2 562 layer parameters for the SCell and their control structure for the multi-RAT platform 135. Further, the RRC 512 configures the MAC2 550 and the PHY2 552 layer parameters for a second radio in the multi-RAT platform 135.

FIG. 6 is a method for multi-cell coordinated operations according to some embodiments. In element 610, a mobile platform such as the multi-RAT platform 135 or the single-RAT platform 140 is associated with a first serving platform, such as the serving platform 106, wherein the mobile platform is attached to a network through a primary cell (PCell) deployed by the first serving platform and the mobile platform communicates with the PCell over a first carrier. In element 620, information is received for a secondary cell (SCell) deployed by a second serving platform through the PCell, wherein SCell resources are scheduled for the mobile platform through the PCell and the mobile platform communicates with the SCell over a second carrier. The resources allocated by the second serving station to the mobile platform may relate to transmission power, scheduling, modulation rate, channel and/or carrier/subcarrier assignment(s). In element 630, data is received by the mobile platform over the first carrier and the second carrier using carrier aggregation (CA) techniques known to those skilled in the art.

Information pertaining to the SCell, such as identification, capability, availability and configuration of the SCell that may be broadcast or multicast to a plurality of mobile platforms served by the PCell. Alternately, the SCell information may be sent to the mobile platform through the PCell using dedicated radio resource control signaling. The configuration information may comprise cell index information for each SCell according to some embodiments. Further, a mode or modes of the multi-cell operation can be communicated to the mobile platform through the PCell. Examples of modes of multi-cell operation include Carrier Aggregation (CA), Coordinated Multipoint Transmission (CoMP), Inter-Cell Interference Cancellation (ICIC), and Carrier Switching (for MBMS), though the embodiment is not so limited.

The PCell may be used in various embodiments to negotiate capability and configuration parameters for the PCell deployed by the serving platform 106 along with SCells collocated on the same serving platform 106 and/or SCells deployed by other serving platforms, wherein the radio access technology (RAT) used by the PCell may be the same or different from the RAT(s) used by the number of SCells. The number of SCells may be activated for multi-cell operation through the PCell using a Level 2 indication, wherein the Level 2 is in reference to data link wireless data transmission protocols. The multi-cell operation may further comprise receiving the data using coordinated multi-point (CoMP) communications in combination with the carrier aggregation techniques. The serving platform deploying the PCell can also be configured to maintain state and mobility control of the mobile platform through the PCell.

The mobile platform of FIG. 6 may be, in some embodiments, a multi-RAT platform 135 configured to operate over a number of wireless protocols. The mobile platform may be configured to operate in a homogeneous network according to a single wireless protocol or a heterogeneous network wherein a plurality of wireless protocols co-exist in the same region. For example, the multi-RAT platform may be configured to operate in one or more networks including a WPAN, a WLAN, a WMAN, a WWAN, and a multicast/broadcast network according to one or more wireless protocols including LTE, WiMAX, WiFi or other wireless protocol standards discussed herein, wherein a wireless protocol used for the PCell is typically a 3G or 4G category wireless protocol. In embodiments where multiple RATs are employed by the mobile platform, cross-RAT capability and configuration is negotiated between the mobile platform and the serving platform that has deployed the PCell.

The mobile platform may also measure channel quality and transmit channel quality indicator (CQI) measurements for the PCell and the one or more SCells to the serving platform deploying the PCell and/or the one or more SCells. A need for cross-cell or multi-cell operation and selection/identification of appropriate cells and RAT's to be used can be evaluated through measurements reported on the PCell. The PCell also carries control channels used for cross cell assignments on the SCell through a physical downlink control channel and/or multicast control channel. Activation of a SCell can demarks the start of multi-cell operation for a mobile platform while multi-cell operation may end with implicit or explicit deactivation.

In embodiments where communications are transceived by the mobile platform with multiple serving platforms, coordination and negotiation of resources on the network side can be provided. For example, the mobile platform may be alerted that the transmissions are sent by alternate cells other than cells provided by the serving platform that has deployed the PCell. For example, the mobile platform may need to know that a second carrier is deployed by another serving platform. Further, the mobile platform may be informed that the SCell is not collocated with the PCell on the same serving platform. Additional signaling may be provided between the PCell and the SCell to allow for intercell coordination.

In embodiments where multiple RATs are used in a mobile platform and a first RAT is used to communicate with a PCell, the first RAT is the primary RAT and RAT(s) used in SCell(s) are secondary RAT(s). The PCell and the SCell may be on the same serving platform or distributed across different serving platforms. Also, in some embodiments, the cells used in a multi-cell operation are deployed as cells by a single serving platform, such as collocated sectors or Remote Radio Elements (RRE's). In an embodiment, a single RRC with multiple but joint MAC operations controlling multiple PHY's are designed to handle multi-cell operation without requiring inter-eNB coordination. In cases where the cells involved in multi-cell operation are not collocated, some cross eNB signaling and coordination is needed, while maintaining one cell as the PCell.

According to some embodiments, the PCell can configure SCells although they are installed on other serving platforms, such as eNBs or BSs. For example, the Cell 3 (PCell) 306 on a second serving platform can obtain configuration parameters of SCells, e.g. the Cell 2 (SCell) 304 through the X2 interface 310 before the serving platform 106 deploying the Cell 3 (PCell) 306 can be configured for multi-cell operation. The Cell 3 (PCell) 306 may also need to request for some resource reservation on the Cell 2 (SCell) 304 of the serving platform 106 prior to activation of the Cell 2 (SCell) 304 to avoid conflicting usage of one or more of the same resource(s). The type of signaling and reservation can depend on a type of multi-cell operation. For example for Coordinated MultiPoint (CoMP) and Intercell Interference Coordination (ICIC), some radio resources on Cell 4 (SCell) 308 of FIG. 3 may be reserved using time division multiplexing (TDM) or frequency division multiplexing (FDM) for cross cell allocations by the Cell 1 (PCell) 302 deployed by the first serving platform. However for multimedia broadcast multicast service (MBMS) or broadcast services, reservation radio resources on a SCell may not apply and a PCell may need to avoid scheduling conflicts through other means.

FIG. 7 is a method for multi-cell and multi-RAT coordinated operations according to some embodiments. A mobile platform is associated with a first serving platform in element 710, wherein the mobile platform is attached to a first network through a primary cell (PCell) deployed by the first serving platform and the mobile platform communicates with the PCell over a first carrier using a first radio access technology (RAT) used to communicate in the first network using a first wireless protocol. In element 720, information is received for a secondary cell (SCell) deployed by a second serving platform through the PCell, wherein SCell resources are scheduled for the mobile platform through the PCell and the mobile platform communicates with the SCell over a second carrier using a second RAT in a second network using a second wireless protocol. In element 730, the mobile platform receives data over the first carrier and the second carrier. In some embodiments, the data may be received using coordinated multi-point (CoMP) communications. Also in some embodiments, the data may also be received through carrier aggregation (CA) of the first carrier and the second carrier.

The operations discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:
1. A method for multi-cell operation, comprising:
   associating a mobile platform with a first serving platform, wherein the mobile platform is attached to a network through a primary cell (PCell) deployed by the first serving platform and the mobile platform communicates with the PCell over a first carrier;

receiving information, for a secondary cell (SCell) deployed by a second serving platform, through the PCell, wherein SCell resources are reserved and scheduled for the mobile platform through the PCell and the mobile platform communicates with the SCell over a second carrier; and receiving data, by the mobile platform, over the first carrier and the second carrier using carrier aggregation.

2. The method of claim 1, wherein the information for the SCell comprises identification, availability, and configuration information.

3. The method of claim 2, wherein the information of the SCell is broadcast or multicast to a plurality of mobile platforms served by the PCell.

4. The method of claim 2, wherein the information is sent to the mobile platform using dedicated radio resource control signaling.

5. The method of claim 2, further including negotiating capability and configuration parameters for the PCell and the number of SCells through the PCell.

6. The method of claim 2, wherein the configuration information provides a cell index for each SCell.

7. The method of claim 1, wherein a mode of the multi-cell operation is communicated to the mobile platform through the PCell.

8. The method of claim 1, wherein the SCell is activated for the multi-cell operation by the PCell using a Layer 2 indication.

9. The method of claim 1, further comprising receiving the data using coordinated multi-point communications.

10. The method of claim 1, wherein the mobile platform is a multi-radio access technology (multi-RAT) platform configured to communicate over a number of wireless protocols.

11. The method of claim 10, wherein the mobile platform communicates over a first wireless protocol and a second wireless protocol.

12. The method of claim 11, wherein the first wireless protocol is a 3GPP wireless protocol and the second wireless protocol is a WiFi wireless protocol.

13. The method of claim 12, wherein cross-radio access technology (cross-RAT) capability and configuration is negotiated between the mobile platform and the first serving platform through the PCell.

14. The method of claim 1, wherein the first serving platform maintains state and mobility control of the mobile platform through the PCell.

15. The method of claim 1, further comprising performing channel quality indicator (CQI) measurements for the SCell by the mobile platform and reporting SCell CQI measurements to the first serving platform through the PCell.

16. The method of claim 1, wherein the PCell carries control channels used for cross cell assignments on the SCell through a physical downlink control channel or multicast control channel.

17. The method of claim 1 wherein the mobile platform is selected from a group consisting of a user equipment (UE), subscriber station (SS), station (STA), mobile station (MS), advanced mobile station (AMS), high throughput (HT) station (STA), and very HT STA (VHT STA), and the first serving platform is selected from a group consisting of a base station (BS) and enhanced node B (eNB).

18. A method for multi-cell operation, comprising:

associating a mobile platform with a first serving platform, wherein the mobile platform is attached to a network through a primary cell (PCell) deployed by the first serving platform and the mobile platform communicates with the PCell over a first carrier using a first radio access technology (RAT);

receiving information for a secondary cell (SCell) deployed by a second serving platform through the PCell, wherein SCell resources are scheduled for the mobile platform through the PCell and the mobile platform communicates with the SCell over a second carrier using a second RAT; and receiving data, by the mobile platform, over the first carrier and the second carrier using coordinated multi-point (CoMP) communications.

19. The method of claim 18, wherein the first RAT is configured to communicate using a wireless wide area network (WWAN) and the second RAT is configured to communicate using a network selected from the group consisting of a wireless personal area network (WPAN), a wireless local area network (WLAN), a wireless metropolitan area network (WMAN), a wireless wide area network (WWAN), and a multicast/broadcast network.

20. The method of claim 18, wherein the mobile platform is selected from the group consisting of a user equipment (UE), subscriber station (SS), station (STA), mobile station (MS), advanced mobile station (AMS), high throughput (HT) station (STA), and very HT STA (VHT STA), and the first serving platform is selected from the group consisting of a base station (BS) and enhanced node B (eNB).

21. The method of claim 18, further comprising receiving the data through carrier aggregation (CA) of the first carrier and the second carrier.

22. A user equipment (UE) comprising a media access control (MAC) layer and a physical (PHY) layer, wherein the UE is configured to:

associate with a first enhanced node B (eNB), wherein the UE is attached to a long-term evolution (LTE) network through a primary cell (PCell) deployed by the first eNB and the UE communicates with the PCell over a first carrier;

receive availability and configuration information about a secondary cell (SCell) deployed by a second eNB through the PCell, wherein the UE communicates with the SCell over a second carrier;

reserve and schedule SCell resources through the PCell; and receive data, by the UE, over the first carrier and the second carrier using carrier aggregation (CA).

23. The UE of claim 22, wherein the PCell carries control channels used for cross cell assignments on the SCell through a physical downlink control channel or multicast control channel.

24. The UE of claim 22, wherein the UE is a multi-radio access technology (multi-RAT) platform configured to communicate over a number of the wireless protocols.

25. A serving platform, comprising:

a processor;

a communication device to deploy a primary cell (PCell) over a first carrier to provide a mobile platform access to a network; and an inter-platform interface to a second serving platform, wherein the inter-platform interface comprises a control plane interface and a user plane interface to provide multi-cell coordinated operations with a secondary cell (SCell) deployed by the second serving platform, the inter-platform interface to reserve and schedule SCell resources for the mobile platform, wherein the mobile platform is configured to communicate with the SCell over a second carrier and the mobile platform is configured to access the network through carrier aggregation of the first carrier and the second carrier.

26. The serving platform of claim 25, wherein the serving platform is selected from the group consisting of a base station (BS), access point (AP), node, node B, and enhanced node B (eNB).

27. The serving platform of claim 25, wherein the serving platform maintains state and mobility control of the mobile platform.

28. The serving platform of claim 25, wherein the communication device is further configured to communicate configuration and availability information about the SCell through the PCell.

* * * * *